(12) United States Patent
Valpola (10) Patent No.: US 11,720,795 B2
(45) Date of Patent: Aug. 8, 2023

(54) NEURAL NETWORK STRUCTURE AND A METHOD THERETO

(71) Applicant: CANARY CAPITAL LLC, Wilmington, DE (US)

(72) Inventor: Harri Valpola, Helsinki (FI)

(73) Assignee: Canary Capital LLC, Wilmington, DE (US)

( * ) Notice: Subject to any disclaimer, the term of this patent is extended or adjusted under 35 U.S.C. 154(b) by 1068 days.

(21) Appl. No.: 15/531,212

(22) PCT Filed: Nov. 26, 2014

(86) PCT No.: PCT/FI2014/050911
§ 371 (c)(1),
(2) Date: May 26, 2017

(87) PCT Pub. No.: WO2016/083657
PCT Pub. Date: Jun. 2, 2016

(65) Prior Publication Data
US 2017/0330076 A1    Nov. 16, 2017

(51) Int. Cl.
G06N 3/084    (2023.01)
G06N 20/00    (2019.01)
G06N 3/02    (2006.01)
G06N 7/04    (2006.01)

(52) U.S. Cl.
CPC ............ *G06N 3/084* (2013.01); *G06N 3/02* (2013.01); *G06N 7/046* (2013.01); *G06N 20/00* (2019.01)

(58) Field of Classification Search
CPC .. G06N 3/02; G06N 3/08; G06N 3/04; G06N 20/00
See application file for complete search history.

(56) References Cited

U.S. PATENT DOCUMENTS

| 6,686,853 B2 * | 2/2004 | Shen | H03M 13/1105 341/50 |
| 2009/0110062 A1 | 4/2009 | Au et al. | |
| 2011/0106539 A1 | 5/2011 | Rhoads | |

FOREIGN PATENT DOCUMENTS

| CN | 101795344 A | 8/2010 |
| CN | 102007737 A | 4/2011 |
| CN | 104050507 A | 9/2014 |
| EP | 2 126 801 B1 | 4/2013 |
| WO | 2008/102052 A2 | 8/2008 |

OTHER PUBLICATIONS

Vincent, Stacked Denoising Autoencoders: Learning Useful Representations in a Deep Network with a Local Denoising Criterion (Year: 2010).*

(Continued)

*Primary Examiner* — Abdullah Al Kawsar
*Assistant Examiner* — Tewodros E Mengistu
(74) *Attorney, Agent, or Firm* — Young Basile Hanlon & MacFarlane, P.C.

(57) ABSTRACT

Disclosed is a neural network structure enabling efficient training of the network and a method thereto. The structure is a ladder-type structure wherein one or more lateral input(s) is/are taken to decoding functions. By minimizing one or more cost function(s) belonging to the structure the neural network structure may be trained in an efficient way.

22 Claims, 4 Drawing Sheets

(56) References Cited

OTHER PUBLICATIONS

Bengio, How Auto-Encoders Could Provide Credit Assignment in Deep Networks via Target Propagation (Year: 2014).*

Pascal Vincent et al: "Stacked Denoising Autoencoders: Learning Useful Representations in a Deep Network with a Local Denoising Criterion Pierre-Antoine Manzagol", Journal of Machine Learning Research, Dec. 31, 2010 (Dec. 31, 2010), pp. 3371-3408, XP055209370, Retrieved from the Internet <URL:http://dl.acm.org/citation.cfm?id=1953039> [retrieved on Aug. 25, 2015].

Yoshua Bengio: "How Auto-Encoders Could Provide Credit Assignment in Deep Networks via Target Propagation", Jul. 29, 2014 (Jul. 29, 2014), XP055204628, Retrieved from the Internet <URL:http://arxiv.org/abs/1407.7906> [retrieved on Aug. 25, 2015].

Pascal Vincent et al: "Extracting and composing robust features with denoising autoencoders", Proceeding ICML '08 Proceedings of the 25th International Conference on Machine Learning, Jan. 31, 2008 (Jan. 31, 2008), pp. 1096-1103, XP055204627, ISBN: 978-1-60-558205-4, DOI: 10.1145/1390156.1390294.

International Search Report, dated Sep. 8, 2015, from corresponding PCT application.

Fan et al., "Research Progress Structural Design of Hidden Layer in BP Artificial Neural Networks", Control Engineering of China, May 2005, vol. 12 (5 pp).

* cited by examiner

NEURAL NETWORK STRUCTURE AND A METHOD THERETO

TECHNICAL FIELD

The invention concerns in general the technical field of neural networks. Especially the invention concerns a neural network structure improving a training of the network.

BACKGROUND OF THE INVENTION

Machine learning methods are utilized widely in modern technology, for example in machine vision, pattern recognition, robotics, control systems and automation. In such applications machine learning is used in computer-implemented parts of a system or device for processing input data.

One classification of machine learning methods is the division into "supervised" and "unsupervised" learning. Supervised learning aims at finding or "learning" a way to produce a given output from a given input, for example correctly classifying a set of input images into categories the images have been labeled to belong to. Unsupervised learning aims at representing structure in the input data, often by means of features. The resulting features can be used as input for classification tasks or as initialization for further supervised learning.

There is wide range of prior art disclosing solutions in the field of machine learning. For example, Vincent et al.: Extracting and Composing Robust Features with Denoising Autoencoders, In Proceedings of the 25th International Conference on Machine Learning (ICML '2008) 2008 introduces a machine learning solution in which denoising autoencoders are arranged to corrupt the inputs of the whole system by noise. Learning matches the clean version of inputs with the corrupted top-down activation. Bottom-up is copied to top-down at the highest layer.

Bengio: "How auto-encoders could provide credit assignment in deep networks via target propagation" 2014, in turn, discloses multiple cost functions at many levels of the network, but does not have a consistent cost function and does not propagate error with backprop. Bottom-up is copied to top-down only at the highest layer.

Furthermore, a machine learning system described in a patent document EP2126801 exhibits an emergent attention-like process which selects information and guides learning. One key aspect of the method described there is the utilization of secondary input information, or "context", to guide the automatic learning process.

However, the prior art solutions has still some drawbacks. Namely, a main problem, especially in view of the solution introduced in EP2126801, is that context drives neighboring processing units to represent the same information. De-correlation works inside a single processing units and keeps this from happening inside one unit, but de-correlation is impractical between all the units in a large network as it is computationally very demanding. This problem can be alleviated by requiring different processing units to receive different sets of inputs, but in many cases this is a harsh limitation.

Furthermore, the prior art solutions for unsupervised learning in deep neural networks are slow and have challenges especially in learning abstract features. Moreover, such solutions are not well compatible with supervised learning.

Context connections should ideally carry correlated information from other sources (other than the bottom-up information). One way of looking at the problem is that it stems from inability to recognize which information comes from other sources and which is just a copy of the bottom-up information that took a different route in the network.

Thus, there is further need to develop machine learning solutions and especially to introduce neural network structure which mitigate the mentioned short-comings of existing systems and which improves the training of the neural network.

SUMMARY OF THE INVENTION

An objective of the invention is to present an improved trainable neural network structure and a method thereto which improves a training of the neural network.

The objectives of the invention are reached by a neural network structure and a method as defined by the respective independent claims.

According to a first aspect, a trainable neural network structure, comprising a base layer and a second layer, is provided wherein the base layer comprises: a corruption function for corrupting an input data of the neural network structure, a decoding function, and a cost function; and the second layer comprises an encoding function, and a decoding function, wherein a corrupted input data is configured to be fed as an input to the encoding function of the second layer, and an encoded corrupted input data is configured to be fed as an input to the decoding function of the second layer and wherein the corrupted input data of the neural network structure and an output of the decoding function of the second layer are configured to be fed as an input to the decoding function of the base layer, and wherein an output of the decoding function of the base layer and the input data of the neural network are configured to be fed as an input to the cost function of the base layer.

The second layer of the neural network structure may further comprise a cost function, wherein an output of the decoding function for the second layer and the input data of the neural network structure encoded with the encoding function of the second layer are configured to be fed as an input to the cost function.

The neural network structure may further comprise at least one further second layer, wherein each of the at least one further second layer is arranged to be connected to a previous second layer, and wherein an output of the encoding function of the previous second layer is configured to be fed as an input to the encoding function of the at least one further second layer, and an output of the encoding function of the at least one further second layer and an output of the decoding function of an upper layer are configured to be fed as an input to the decoding function in the at least one further second layer.

The at least one further second layer may further comprise a cost function, wherein an output of the decoding function of the same at least one further second layer and the input data of the neural network structure encoded with encoding functions of each layer previous to the at least one further second layer in question are configured to be fed as an input to the at least one cost function of the at least one further second layer.

According to a second aspect, a method for training the neural network structure as described above is provided, the method comprising adjusting at least one parameter of at least one function in at least one of the layers so that a cost function defined for the neural network structure is minimized, when the neural network is trained by inputting input data to the structure.

The input data of the layer-specific cost function may be compared.

The cost function defined for the structure may be a sum of layer-specific cost functions defined for at least one layer in the neural network structure.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
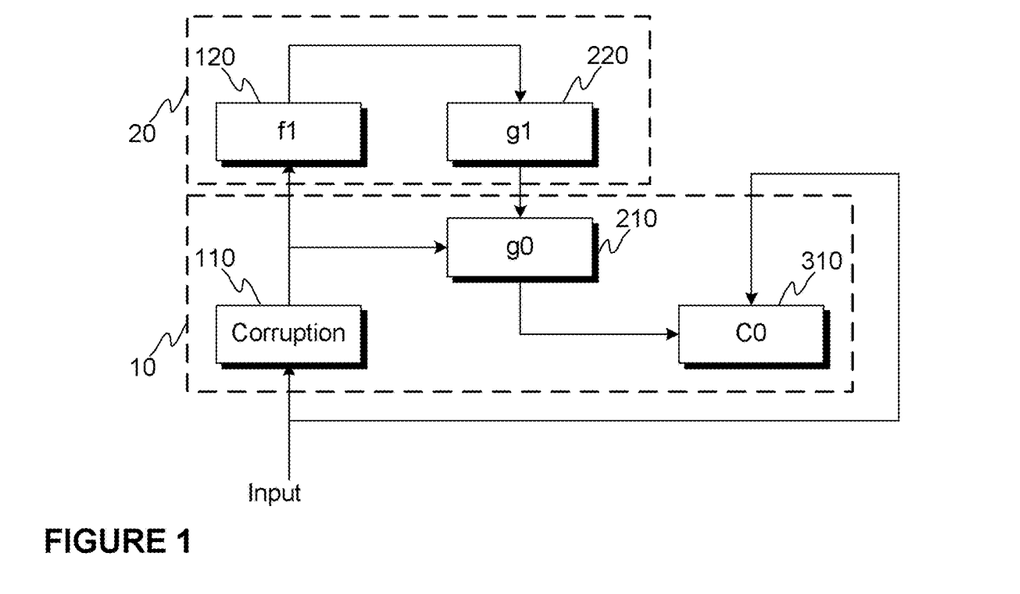
FIG. 1 schematically illustrates a first example of the neural network structure according to the invention.

The present invention discloses a neural network structure, which enables an efficient training of the neural network. FIG. 1 schematically illustrates a neural network structure according to an embodiment of the invention. The neural network structure, as illustrated in FIG. 1, comprises a base layer 10 and a second layer 20. The base layer 10, in turn, comprises a corruption function 110, a decoding function 210 and a cost function 310. The second layer 20, as depicted FIG. 1, comprises an encoding function 120 and a decoding function 220. An input data is brought to the neural network. The input data is taken to a corruption function 110. The encoding function 120 of the second layer 20 receives as an input a corrupted input data. Further, the decoding function 220 of the second layer 20 receives as an input a corrupted input data encoded with the encoding function 120 of the second layer 20. The output of the decoding function 220 of the second layer 20 is brought as an input to the decoding function 210 of the base layer 10 together with the corrupted input data of the neural network structure, which is brought as a lateral input to the decoding function 210. The cost function 310 of the base layer 10 receives as an input the output of the decoding function 210 of the base layer 10 and the input data of the neural network. For sake of clarity one may say that the structure as depicted in FIG. 1 comprise a cost function, which comprises only one cost function term from the base layer.

Figure 2:
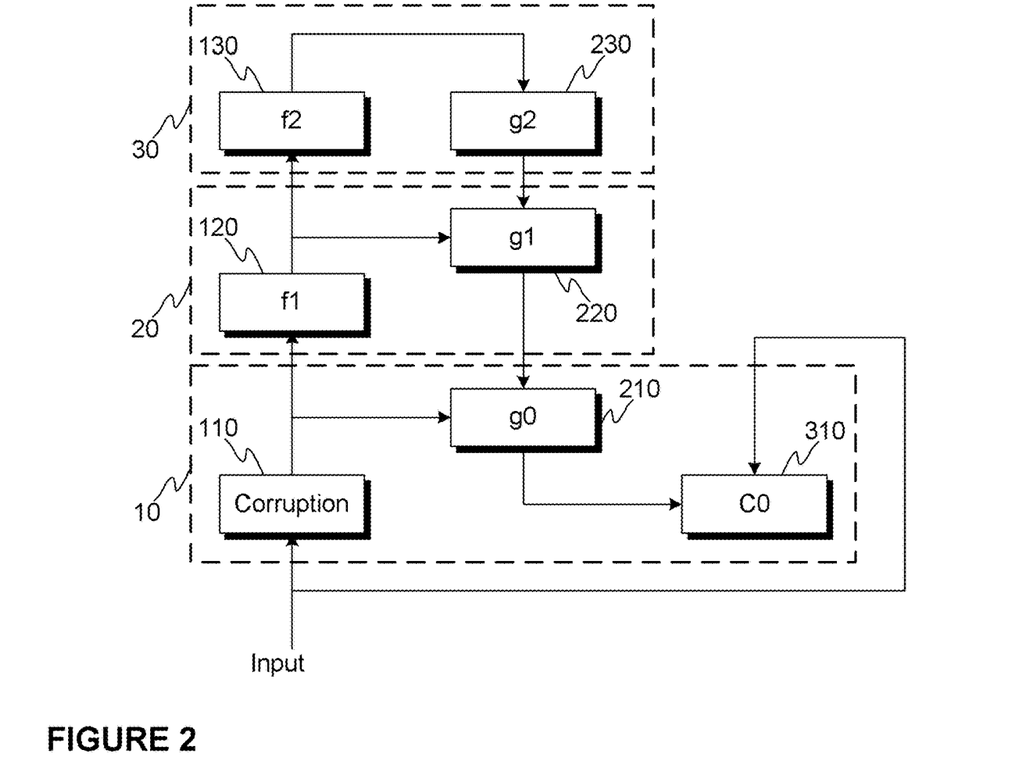
FIG. 2 schematically illustrates another example of the neural network structure according to the invention.

The neural network structure as illustrated in FIG. 1 may be modified within the spirit of the present invention by adding one or more second layers to the structure. FIG. 2 illustrates an embodiment of the invention wherein the neural network structure according to an embodiment of the invention comprises one other second layer 30 in addition to the first second layer 20. The other second layer 30 comprises an encoding function 130 of the other second layer and a decoding function 230 of the other second layer. The encoding function 130 of the other second layer 30 receives its input from the output of the encoding function 120 of the first second layer 20. Furthermore, the output of the encoding function 130 of the other second layer 30 is taken to the input of the decoding function 230 of the other second layer 30. In the implementation of the invention in FIG. 2, the decoding function 220 of the first second layer 20 receives, as an input, the output of the decoding function 230 of the other second layer 30 and the output of the encoding function 120 of the first second layer 20, which is brought as a lateral input to the decoding function 220.

Figure 3:
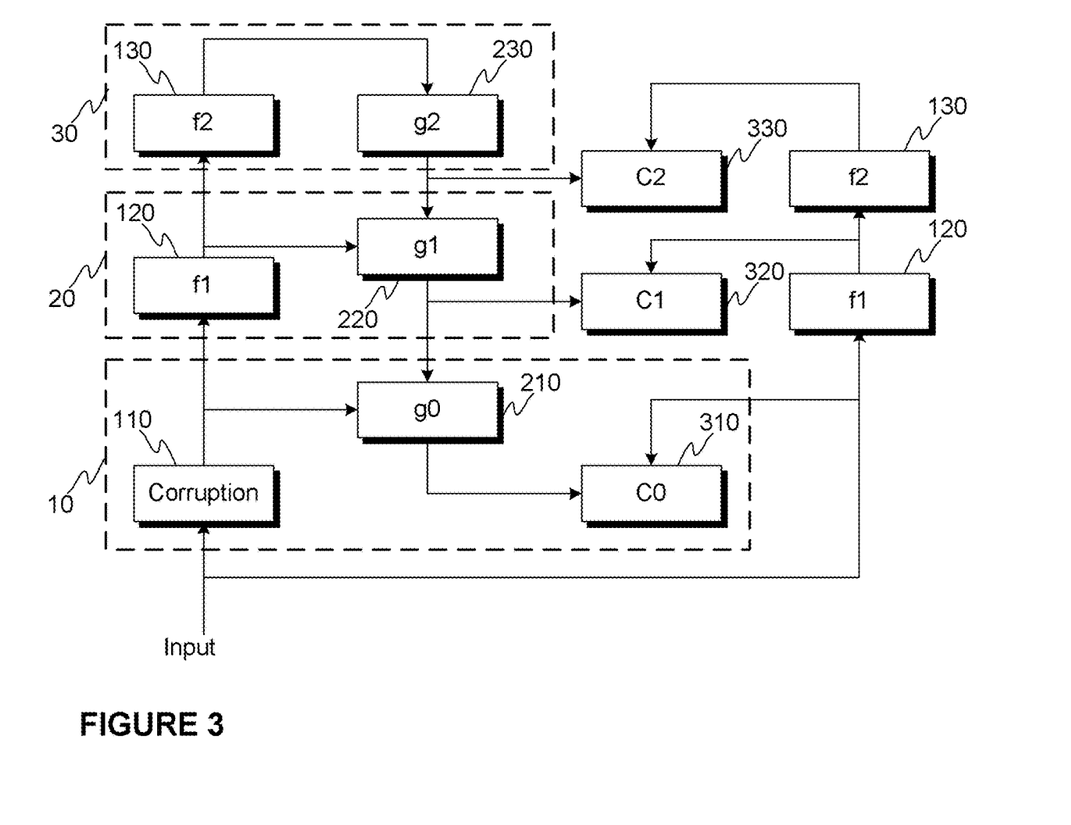
FIG. 3 schematically illustrates a still further example of the neural network structure according to the invention.

A further embodiment of the invention is schematically illustrated in FIG. 3. In the implementation it is arranged further cost functions 320, 330 for each second layer i.e. for the first second layer 20 and for the other second layer 30. The cost function 320 of the first second layer 20 receives its input from the output of the decoding function 220 of the first second layer 20 and from the input of the neural network structure encoded with the encoding function 120 of the first second layer 20. Similarly, the cost function 330 of the other second layer 30 receives its input from the output of the decoding function 230 of the other second layer 30 and from the output of the encoding function 130 of the other second layer 20, which is arranged to encode the output of the encoding function 120 of the first second layer 20. A total cost for the structure as depicted in FIG. 3 may be derived by summing up the cost function terms, i.e. layer-specific cost functions, from the layers implemented in the structure.

Figure 4:
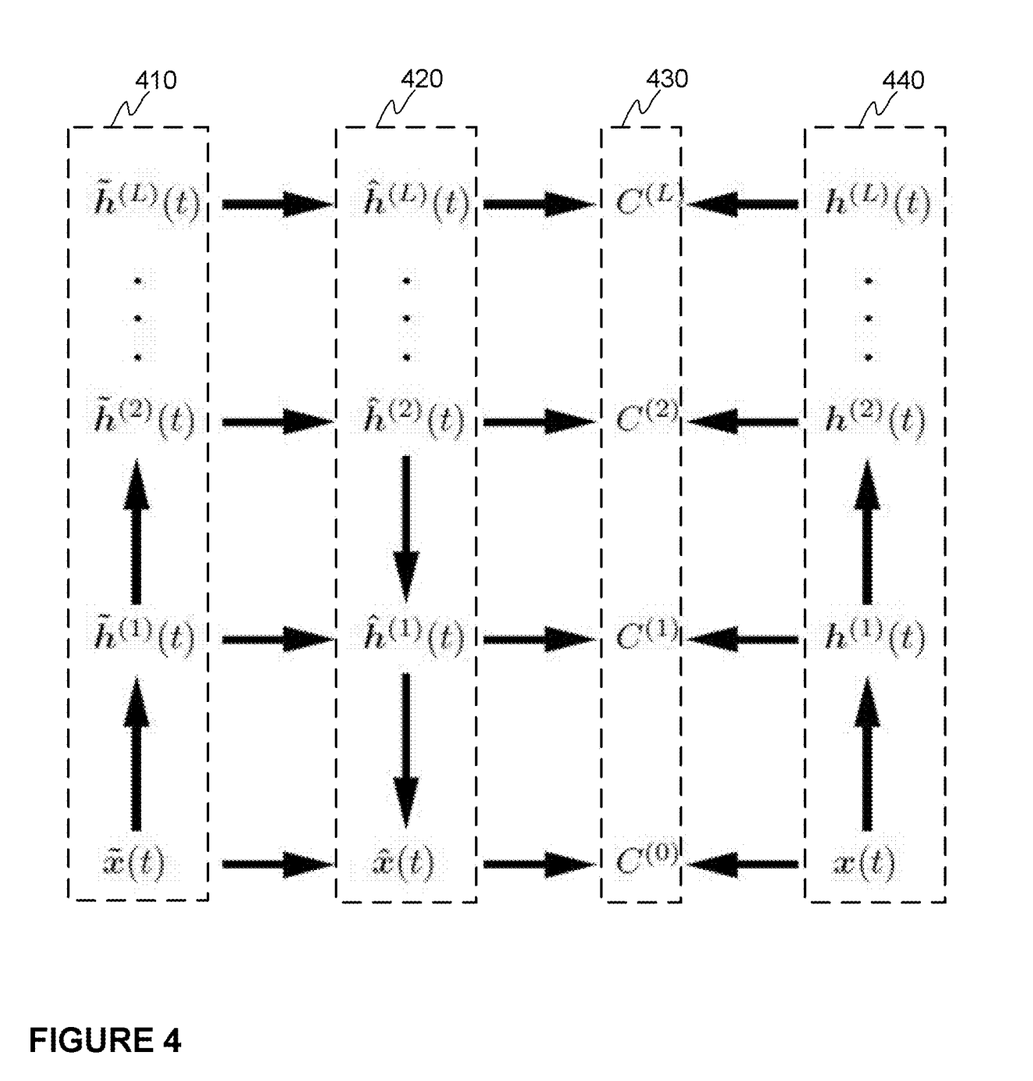
FIG. 4 schematically illustrates the fundamental structure of the neural network structure according to the present invention.

FIG. 4 schematically illustrates the fundamental structure of the neural network according to the present invention. In principle, the structure comprises four blocks. The first block 410 is an encoding path, which is arranged to perform predetermined encoding functions to a corrupted input $\tilde{x}(t)$. Symbols $\tilde{h}^1(t)$-$\tilde{h}^L(t)$ in FIG. 4 refer to outputs of the encoding functions. The second block 420 is a decoding path, or denoising path, which is arranged to perform predetermined decoding functions to inputs, i.e. lateral inputs, from the first block 410 and from the previous decoding functions. Symbols $\hat{h}^1(t)$-$\hat{h}^L(t)$ in FIG. 4 refer to outputs of the decoding functions. The fourth block 440 is another encoding path, which is arranged to perform predetermined encoding functions to an input $x(t)$ of the neural network (i.e. the clean input). Symbols $h^1(t)$-$h^L(t)$ in FIG. 4 refer to outputs of the encoding functions in the encoding path of the fourth block 440. The third block 430 refers to cost function path, which is arranged to perform predetermined function, such as comparison, to inputs received from the second block 420 and the fourth block 440. Symbols $C^1$-$C^L$ in FIG. 4 refer to cost function terms within the neural network structure. In the schematic illustration of FIG. 4 it is depicted that a cost function is arranged to each layer of the neural network structure. As mentioned, it is not necessarily the case in all implementations according to the present invention, which has also impact to the necessary encoding functions in the fourth block 440. In any case the (total) cost function for a structure according to the invention may be defined by summing up the cost function terms from the layers implemented in the structure. Summarizing the discussion relating to FIG. 4 the present invention discloses a ladder type neural network structure.

The encoding and decoding functions, as discussed above, are arranged to perform predetermined operations to input data. More specifically, an encoding function f takes an input x and produces as output encoded input data. This may also be called "mapping" the input x to a "representation" y with a mapping:

$$y=f(x)$$

Such mapping may e.g. be $$y=s(Wx+b)$$

where W and b are the parameters of the encoding function and s is a non-linear function, such as the sigmoid or hyperbolic tangent function. When training the neural network, W and b are sought so that the cost function(s) are minimized. W and b are matrices or vectors of numerical values which are stored in computer memory or storage, and the expression for y is evaluated on a computer.

Conversely, a decoding function g is a similar mapping that takes an input y and produces as output a "reconstruction" of the encoded input data $\hat{x}$. Such mapping may e.g. be $$\hat{x}=g(y)=s(W'y+b')$$

where W' and b' are the parameters of the decoding function s is a non-linear function, such as the sigmoid or hyperbolic tangent function and the parameters are sought in the training of the neural network. One option is also to tie the value of W' to the value of W with some rule, for example making W' always the matrix transpose of W. Because y may be a "lossy" representation of x, $\hat{x}$ may likewise not be an exact reconstruction of the original data.

A cost function C is a function that is used to evaluate how well a decoding function was able to reconstruct the input data of an encoding function. The cost function may e.g. be $$C=\|\hat{x}-x\|^2$$

When training the network, the parameters of the encoding and decoding functions are adjusted until the cost function is minimized. Ways to minimize the cost function with respect to the parameters are readily found in the literature and basically any optimization method can be used, for example nonlinear conjugate gradient or quasi-Newton methods. The total cost function for a structure according to the invention may be defined as a sum of the cost function terms from one or more layers into which cost function is determined.

As it becomes clear already from the description above it is not necessary to implement a cost function for every layer in the neural network structure. It may be that only one cost function is arranged to the structure or there may be a cost function, i.e. cost function terms, arranged for each layer in the structure or anything between these two. Cost functions on multiple layers speed up learning when the neural network is trained, but may then require more computing resources. According to the invention it is advantageous to sum up the cost function terms from each layer and to minimize the total cost function in order to determine the parameters for the neural network structure i.e. to the functions therein.

Also, a standard supervised cost function may simply be added to the top-most layer, measuring the distance between and the target output. Since the gradients propagate backward along the encoding path, this structure is hence fully compatible with supervised learning. A neural network with this structure may then be trained both in unsupervised and supervised manner.

Figure 5:
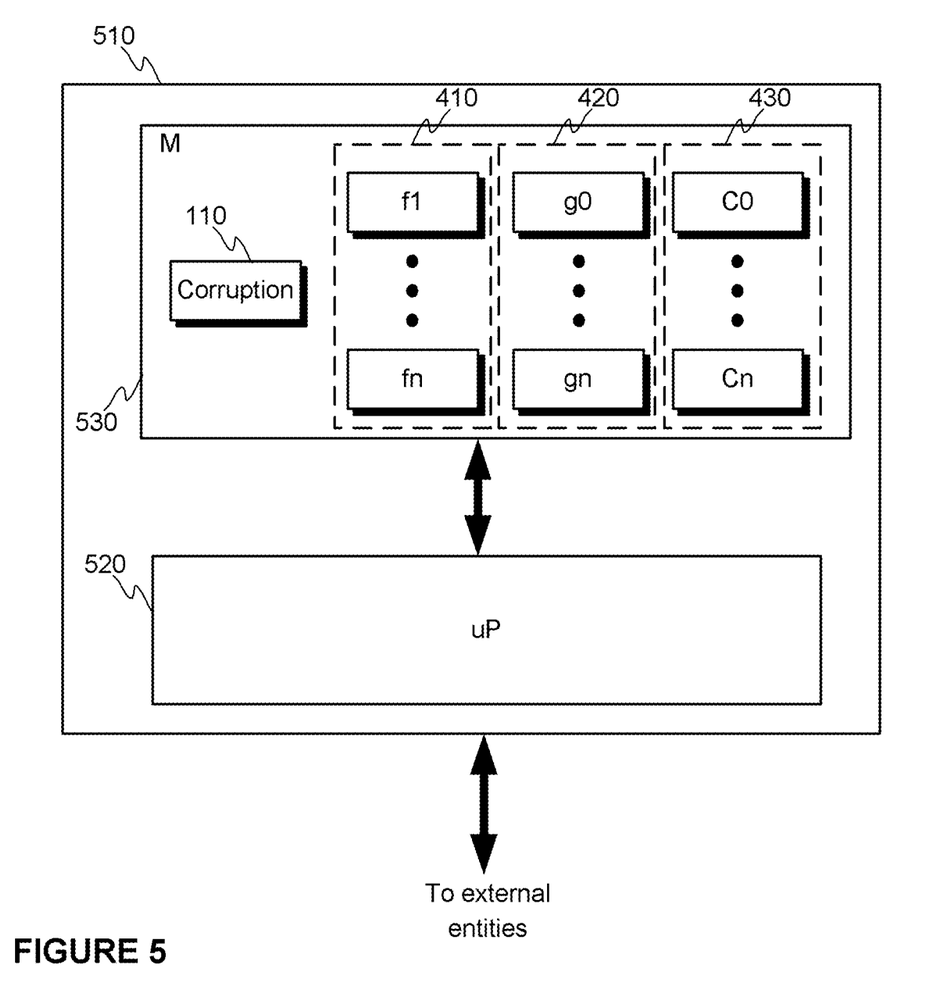
FIG. 5 schematically illustrates an example of a computing unit according to the present invention.

In practice, the implementation of the functions and operations as discussed above in the description of the neural network structure may be performed in a computing unit arranged to train the neural network. Such a computing unit 510 is illustrated in FIG. 5. The computing unit 510 may comprise one or more processing units 520, such as processors, and one or more memory units 530. The mentioned functions and operations defined as portions of computer program code, which are stored in the memory unit 530. The mentioned functions and operations are arranged to be performed in a predetermined order, such as hierarchically, when the portions of computer program code are executed by the processing unit 520. The functions and operations may, according to an embodiment, be performed by one or more processors. A result of a function or an operation may be taken as an input to the next function or operation internally in a processor, or in case of multiple processors an intermediate result, i.e. result from a function or an operation, may be transferred between the processors either directly or indirectly though e.g. a memory. The memory units 530 may be configured to store, at least temporarily, at least some outputs of the functions and operations, but at least parameters of the functions by means of which an optimal solution for the total cost function may be achieved. As already said, the one or more memory units 530 are advantageously arranged to store at least some portions of the computer program code, which causes the processor(s) to perform the functions and operations as described when at least some portions of the computer program code are executed in the processor(s). The optimal solution herein refers to minimizing the total cost function defined for the structure in a predetermined manner, e.g. so that the difference between the output of the decoding block differs from the input signal below a predetermined limit. Thus, the outcome of the invention is that parameters for the neural network structure may be generated and thus utilized when the neural network is taken into use in an application. The computing unit 510 is configured to provide, such as to transmit, the defined parameters to any external entity, which is configured to perform a predetermined task for which the training is performed.

Next the invention is described in an exemplified manner in a context of image classification and searching application.

In the example, the invention is used in a task where digital images are to be automatically classified, for example for searching similar images from an image database.

A neural network with structure depicted in FIG. 3 is trained to classify digital images, which consist of pixel data for three color channels r, g and b. The images are first preprocessed in a typical way for this kind of task: Each image is split into smaller images, or "patches", of size 10×10 pixels. Each such patch then constitutes an input data vector of 300 numerical values (3 color values x 10×10 pixels). The input data vectors are then normalized by deducting from the values the average value, and whitened using a whitening transformation.

The neural network to be trained is set up in a structure according to FIG. 3. In this example, the corruption step 110 is done by adding Gaussian noise of variance 1 to the input data vector.

In this example, the encoding functions f1 120 and f2 130 are selected to be $$f_i = r(A_i\, x_i - b_i)$$

where r is the rectifier function, Ai and bi are parameter matrices, xi is the input to the encoding function and i denotes the layer number, the decoding function g0 of the base layer, in this example, is selected to be $$g0 = B'x' + B0 h0 + b0$$

where x' is the corrupted input, h0 is the output of g1, B', B0 and b0 are parameter matrices, and the decoding functions gi of further layers, in this example, are selected to be $$gi = hi * s(Bi\, xi + bi)$$

where * denotes element-wise multiplication, Bi and bi are parameter matrices, and the cost functions C are selected to be $$C = \|\hat{x} - x\|^2$$

The network is trained by minimizing the sum of the cost functions (not disclosed in FIG. 3 as such). Before training, parameter matrices and vectors Ai, B', Bi, bi are initialized to random values. Sizes of the parameter matrices generally speaking depend on the application; in this example, A1 is a matrix of size 300×400 and A2 400×15, which determine the dimensions of the other matrices. The output of the neural network is hence a vector of length 15.

In this example, the network is then trained using the well-known gradient descent method, which is set to minimize the sum of the cost functions in the network, with the parameter matrices and vectors as the parameters to be optimized, and the preprocessed image patches as training data.

After training is complete, the optimized values of the parameters constitute the parameters of the trained neural network, which has learned to represent the image patches with high-level features. In this example, which is kept simple in order to clearly demonstrate the invention, the features produced by the encoding function f1 roughly correspond to finding edges and other such sharp transitions in the images, and the higher level features produced by the encoding function f2 correspond to an indication of the presence of such features in the image, but invariant to where in the image they exactly appear. This exemplifies the important aspect of the invention, in that the lateral connections in the structure have allowed it to learn these more location-invariant higher-level features.

The trained neural network may then be used to classify further new images, by preprocessing a new image in the same way and evaluating the encoding functions with these parameters and the new preprocessed data as input. Similar images will then produce similar output vectors. Because the lateral connections in the structure have allowed the neural network to learn the more location-invariant higher-level features, images of a same object in slightly different positions would produce similar output vectors, be classified as similar and thus e.g. be found in a searching application.

This example has so far concerned only unsupervised learning, but supervised learning can also be incorporated. For example, some image patches may be labelled. This information may be taken into account by adding a cost function term Cs parallel to the cost function on the topmost layer, so that it receives as input the encoded output data of the encoding function of the topmost layer and the label of the current input data. If the input data is not labelled, the output of Cs may be set to 0. Now, when the neural network is trained, if an input image patch is labelled, the network will learn representations from the data in an unsupervised manner, while the supervised learning cost function term Cs will guide the learning towards representations which result in classification results closer to the labelled correct classifications. In this example, the labels would be vectors of length 15, for example 15 bits where a bit is 1 if the image has been labelled to belong in one of 15 classes, and 0 if not. Then the output vector of the neural network may, after normalizing with e.g. the softmax function, be interpreted as probability that the input image belongs to this class, and Cs may be calculated as e.g. the cross entropy of the output and the label.

In this example a simple MLP-style neural network was used, but the invention is equally applicable to other types of neural networks. For example, convolutional networks are widely used in machine learning applications in image processing and pattern recognition applications similar to this example. The invention can be applied to convolutional networks simply by selecting the encoding functions to be the convolutions, where the parameters are then the convolutional kernels, and training the networks works in a similar manner.

The final application of the trained neural network in the previous example only made use of the learned parameters of the encoding functions f, but the learned parameters of the decoding functions g may also be utilized in applications. As another example of an application of the invention, consider an application where the invention may be used to create a system for filling in missing data in input data by "sampling", using the trained neural network. In this example, the input data consists of photographs, and the trained network is then used to fill in holes in other, damaged photographs. The preprocessing and training of the neural network may be done as in the previous example, but the corruption step 110 is modified so that the corruption resembles the damage in the damaged photographs. For example, if the photographs have small holes in them instead of adding Gaussian noise, randomly selected ranges of the input data are set to zero, i.e. "holes" are inserted in the input data. Alternatively, an initial guess can already be provided by setting the data to e.g. the average of the pixel values at the "edges" of the "hole", which will later speed up the application. When trained, the neural network now effectively learns to fill in the holes in the corrupted input data with newly generated data. After the neural network has been trained, it can be incorporated into a software program where the user provides a photograph and, in this example, marks an area of pixels in the photograph to be filled in with generated data. When the trained network (i.e. the encoding and decoding functions) is evaluated with the provided photograph as input data, the output of the decoding function 210 produces a version of the data where the marked area has filled with "sampled", generated data. This procedure is then iterated further, now by replacing the corruption step 110 with combining the original user provided photograph and the output of decoding function 210, so that the pixel values for the marked area are chosen from the output of decoding function 210, and the pixel values for the other areas are chosen from the original user provided photograph.

The neural network structure according to the present invention provides advantages over the prior art solutions at least in a sense that it improves the training of the neural network. This is achieved by means of the lateral inputs to the decoding functions, which enable a learning of abstract features, such as invariant features in the image example above, on the higher layers and effective cooperation of the solution together with cost functions of supervised learning solutions. Moreover, the cost function terms arranged on the higher layers enhance and accelerate the learning of the neural network. Hence, the advantages of the present invention are clear over the prior art.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A system, comprising:
   a memory; and
   one or more processors configured to execute instructions stored in the memory to define a neural network structure that is trained using one or more cost functions and includes a base layer and a second layer, wherein:
   the base layer includes a corruption function and a decoding function,
   the second layer includes an encoding function and a decoding function,
   the corruption function of the base layer receives input data of the neural network structure as an input and generates corrupted input data,
   the encoding function of the second layer receives the corrupted input data from the corruption function of the base layer as an input and generates a second layer encoding output,
   the decoding function of the second layer receives the second layer encoding output from the encoding function of the second layer as an input and generates a second layer decoding output,
   the decoding function of the base layer receives the second layer decoding output from the decoding function of the second layer as an input, receives the corrupted input data from the corruption function of the base layer as a lateral input, and generates a base layer decoding output, and
   the one or more cost functions include a cost function of the base layer, the cost function of the base layer receives the base layer decoding output from the decoding function of the base layer as an input and receives the input data of the neural network structure as an input.

2. The system of claim 1, wherein the one or more cost functions include a cost function of the second layer, wherein the second layer decoding output and the input data of the neural network structure encoded with the encoding function of the second layer are configured to be fed as an input to the cost function.

3. The system of claim 1, the neural network structure further comprising:
   a third layer, wherein:
   the second layer encoding output of the encoding function of the second layer is configured to be fed as an input to an encoding function of the third layer, and
   a third layer encoding output of the encoding function of the third layer is configured to be fed as an input to a decoding function of the third layer, and
   a third layer decoding output that is generated by the decoding function of the third layer is provided to the decoding function of the second layer as an input.

4. The system of claim 1, wherein the lateral input of the corrupted input data from the corruption function of the base layer to the decoding function of the base layer allows the neural network structure to learn location-invariant features.

5. The system of claim 1, wherein:
   the corruption function of the base layer and the encoding function of the second layer are part of an encoding path,
   the decoding function of the second layer and the decoding function of the base layer are part of a decoding path, and
   the corrupted input data is provided to the decoding function of the base layer using a lateral connection from the encoding path to the decoding path.

6. The system of claim 1, wherein:
   the corruption function of the base layer and the encoding function of the second layer are part of an encoding path,
   the decoding function of the second layer and the decoding function of the base layer are part of a decoding path,
   the base layer includes a first connection for providing information from the encoding path to the decoding path, and
   the second layer includes a second connection for providing information from the encoding path to the decoding path.

7. A method for neural network training using one or more cost functions, the method comprising:
   providing a neural network structure that includes a base layer and a second layer, wherein:
   the base layer includes a corruption function and a decoding function,
   the second layer includes an encoding function and a decoding function,
   the corruption function of the base layer receives input data of the neural network structure as an input and generates corrupted input data,
   the encoding function of the second layer receives the corrupted input data from the corruption function of the base layer as an input and generates a second layer encoding output, and
   the decoding function of the second layer receives the second layer encoding output from the encoding function of the second layer as an input and generates a second layer decoding output,
   the decoding function of the base layer receives the second layer decoding output from the decoding function of the second layer as an input, receives the corrupted input data from the corruption function of the base layer as a lateral input, and generates a base layer decoding output, and
   the one or more cost functions include a cost function of the base layer, the cost function of the base layer receives the base layer decoding output from the decoding function of the base layer as an input and receives the input data of the neural network structure as an input;
   providing training data to the neural network structure as the input data; and
   adjusting at least one parameter of at least one function in at least one of the base layer and second layer to minimize the one or more cost functions.

8. The method of claim 7, wherein:
   the neural network structure includes a third layer,
   the second layer encoding output of the encoding function of the second layer is configured to be fed as an input to an encoding function of the third layer, and a third layer encoding output of the encoding function of the third layer is configured to be fed as an input to a decoding function of the third layer, and a third layer decoding output that is generated by the decoding function of the third layer is provided to the decoding function of the second layer as an input.

9. The method of claim 7, wherein adjusting at least one parameter of the at least one function in the at least one of the base layer and second layer to minimize the one or more cost functions includes minimizing a sum of the cost function for the base layer of the neural network structure and a cost function for the second layer of the neural network structure.

10. The method of claim 7, wherein the one or more cost functions include a cost function for the second layer, the second layer decoding output of the decoding function for the second layer is provided as an input to the cost function for the second layer, and the input data of the neural network structure encoded with the encoding function of the second layer is provided as an input to the cost function for the second layer.

11. The method of claim 7, wherein the lateral input of the corrupted input data from the corruption function of the base layer to the decoding function of the base layer allows the neural network structure to learn location-invariant features.

12. The method of claim 7, wherein:
the corruption function of the base layer and the encoding function of the second layer are part of an encoding path,
the decoding function of the second layer and the decoding function of the base layer are part of a decoding path, and
the corrupted input data is provided to the decoding function of the base layer using a lateral connection from the encoding path to the decoding path.

13. The method of claim 7, wherein:
the corruption function of the base layer and the encoding function of the second layer are part of an encoding path,
the decoding function of the second layer and the decoding function of the base layer are part of a decoding path,
the base layer includes a first connection for providing information from the encoding path to the decoding path, and
the second layer includes a second connection for providing information from the encoding path to the decoding path.

14. A non-transitory computer-readable storage device including program instructions executable by one or more processors that, when executed, cause the one or more processors to perform operations, the operations comprising:
corrupting input data using a corruption function of a base layer of a neural network structure to generate corrupted input data;
encoding the corrupted input data using an encoding function of a second layer of the neural network structure to generate a second layer encoding output;
decoding the second layer encoding output using a decoding function of the second layer of the neural network structure to generate a second layer decoding output; and
decoding the second layer decoding output using a decoding function of the base layer of the neural network structure by providing the corrupted input data to the decoding function of the base layer as a lateral input to generate a base layer decoding output.

15. The non-transitory computer-readable storage device of claim 14, further comprising:
providing training data to the neural network structure as the input data; and
adjusting at least one parameter of at least one of the encoding function of the second layer, the decoding function of the second layer, or the decoding function of the base layer to minimize one or more cost functions of the neural network structure.

16. The non-transitory computer-readable storage device of claim 15, wherein the one or more cost functions include a cost function for the base layer of the neural network structure that receives the input data and the base layer decoding output as inputs.

17. The non-transitory computer-readable storage device of claim 14, further comprising:
providing training data to the neural network structure as the input data; and
adjusting at least one parameter of the encoding function of the second layer, adjusting at least one parameter of the decoding function of the second layer, and adjusting at least one parameter of the decoding function of the base layer to minimize one or more cost functions of the neural network structure.

18. The non-transitory computer-readable storage device of claim 14, wherein the lateral input of the corrupted input data from the corruption function of the base layer to the decoding function of the base layer allows the neural network structure to learn location-invariant features.

19. The non-transitory computer-readable storage device of claim 14, wherein:
the corruption function of the base layer and the encoding function of the second layer are part of an encoding path,
the decoding function of the second layer and the decoding function of the base layer are part of a decoding path, and
the corrupted input data is provided to the decoding function of the base layer using a lateral connection from the encoding path to the decoding path.

20. The non-transitory computer-readable storage device of claim 14, wherein:
the corruption function of the base layer and the encoding function of the second layer are part of an encoding path,
the decoding function of the second layer and the decoding function of the base layer are part of a decoding path,
the base layer includes a first connection for providing information from the encoding path to the decoding path, and
the second layer includes a second connection for providing information from the encoding path to the decoding path.

21. The non-transitory computer-readable storage device of claim 14, wherein the decoding function of the base layer uses the second layer decoding output and the corrupted input data to generate the base layer decoding output.

22. The non-transitory computer-readable storage device of claim 14, wherein the decoding function of the base layer receives the second layer decoding output from the decoding function of the second layer and the decoding function of the base layer receives the corrupted input data from the corruption function of the base layer.

* * * * *